US010346766B1

(12) United States Patent
Yao et al.

(10) Patent No.: US 10,346,766 B1
(45) Date of Patent: Jul. 9, 2019

(54) DETERMINATION AND OPTIMIZATION OF DELIVERY ROUTES

(71) Applicant: Amazon Technologies, Inc., Reno, NV (US)

(72) Inventors: Jie Yao, Newcastle, WA (US); Shashi Mittal, Seattle, WA (US); Girish M. Kulkarni, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 903 days.

(21) Appl. No.: 13/655,803

(22) Filed: Oct. 19, 2012

(51) Int. Cl.
*G06Q 10/04* (2012.01)
*G06Q 10/08* (2012.01)
*G06Q 10/00* (2012.01)
*G06Q 30/00* (2012.01)

(52) U.S. Cl.
CPC ......... *G06Q 10/047* (2013.01); *G06Q 10/083* (2013.01)

(58) Field of Classification Search
CPC ........ G01C 21/343; G05B 2219/32333; G05B 2119/40473; G05B 2219/40384; G05B 2219/31051; G06Q 10/047; G06Q 10/04
See application file for complete search history.

(56) References Cited

U.S. PATENT DOCUMENTS

| | | | | | |
|---|---|---|---|---|---|
| 5,272,638 | A | * | 12/1993 | Martin | G01C 21/3446 340/990 |
| 2001/0047285 | A1 | * | 11/2001 | Borders | G06Q 10/06314 705/7.24 |
| 2005/0049942 | A1 | * | 3/2005 | Richard et al. | 705/28 |
| 2006/0235739 | A1 | * | 10/2006 | Levis | G06Q 10/08 705/1.1 |
| 2008/0147473 | A1 | * | 6/2008 | Zhong et al. | 705/9 |
| 2008/0306795 | A1 | * | 12/2008 | Ho | G06Q 10/047 705/7.26 |
| 2013/0159028 | A1 | * | 6/2013 | Lerenc et al. | 705/5 |

OTHER PUBLICATIONS

Lawler et al., "The Traveling Salesman Problem: A Guided Tour of Combinatorial Optimization," John Wiley & Sons, 1985, pp. 207-249.*
Takenaka et al., "An improved genetic algorithm using the convex hull for traveling salesman problem." 1998 IEEE Conference on Systems, Man, and Cybernetics.*
Gendreau et al., "New Insertion and Postoptimization Procedures for the Traveling Salesman Problem," Operations Research, vol. 40, No. 6, Nov.-Dec. 1992.*
Meeran, S., and A. Shafie. "Optimum Path Planning using Convex Hull and Local Search Heuristic Algorithms." Mechatronics 7.8 (1997): 737-56. ProQuest. Web. Nov. 14, 2016.*

* cited by examiner

*Primary Examiner* — George Chen
(74) *Attorney, Agent, or Firm* — Thomas | Horstemeyer, LLP (57) ABSTRACT

Disclosed are various embodiments for determining and plotting delivery routes in a computing device. A set of solutions to the traveling salesman problem may be determined by applying a convex hull to determine a set of initial solutions. Computational complexity may be reduced by decreasing the dimensions of the initial solutions. The set of initial solutions may be further optimized by applying genetic optimization to determine the most efficient solutions.

22 Claims, 9 Drawing Sheets

DETERMINATION AND OPTIMIZATION OF DELIVERY ROUTES

BACKGROUND

Delivery routes are created for delivery trucks to follow in order to distribute items to locations provided by customers. Inefficient delivery routes continue to add unnecessary costs to delivery businesses.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to determining, optimizing, and plotting delivery routes in a computing device. Generally, in electronic commerce applications, buyers of products provide a shipping address in which to receive an item purchased. Multiple orders may be accumulated leading to a delivery of all items purchased. A determination of one or more potential delivery routes may be made, optimized, and plotted on a user interface. For example, in order to calculate an initial set of candidate routes, locations provided from various buyers may be converted to geocoordinates and a convex hull may be applied to the geocoordinates. For example, the location may be a shipping address provided by a buyer. Alternatively, the location may be geocoordinates provided by an electronic device. The initial set of candidate routes may be genetically optimized to determine the most efficient candidate routes. Efficient candidate routes may be identified and/or plotted on a digital map.

Figure 1:
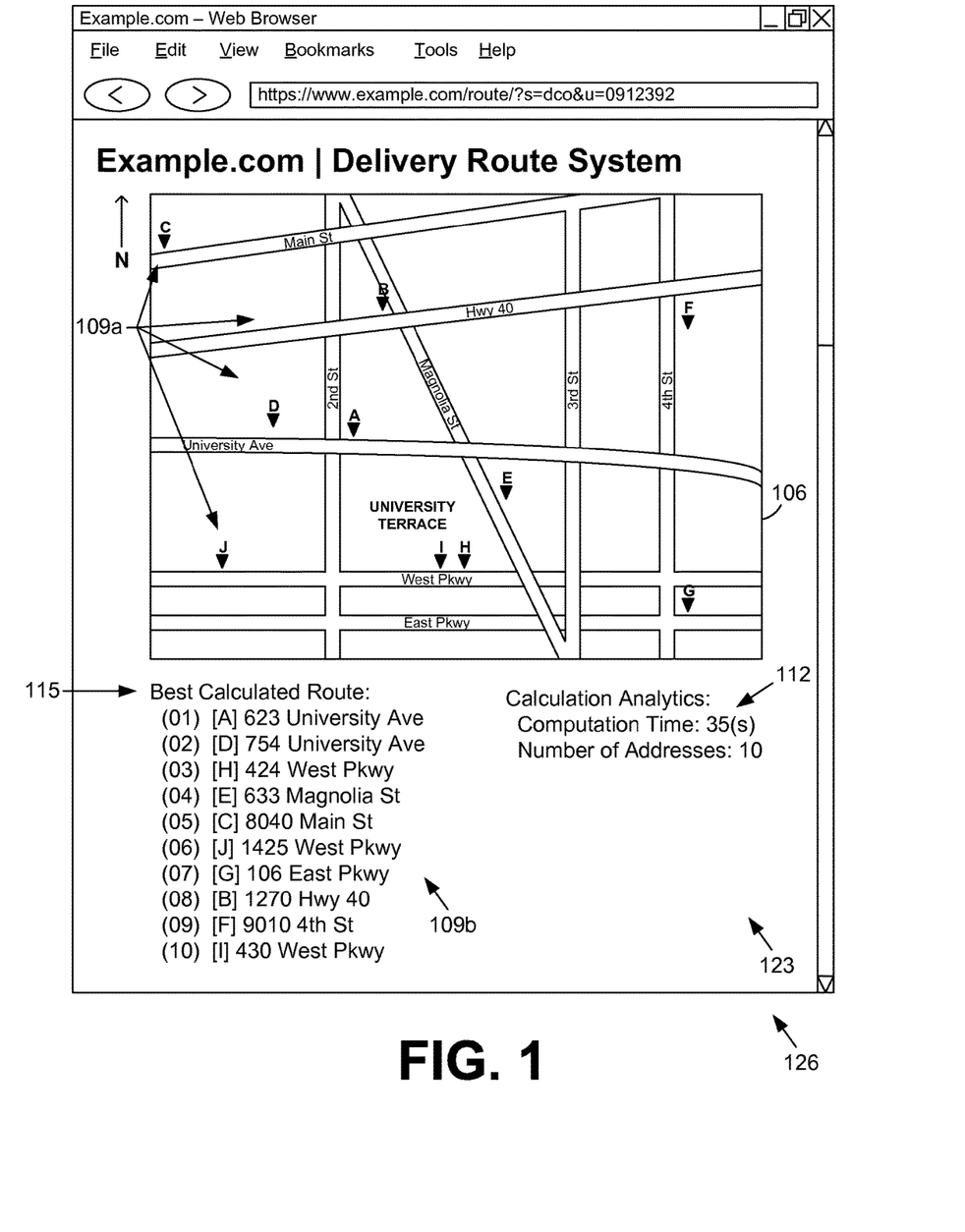
FIG. 1 is a drawing of an example of a user interface rendered by a client in a networked environment according to various embodiments of the present disclosure.

With reference to FIG. 1, shown is an example of a user interface 126 rendered on a client. The route determination system 123 may generate various candidate routes 115, wherein each candidate route 115 is a potential route a delivery truck may take to visit each stop corresponding to the delivery addresses 109. In this non-limiting example, the delivery addresses 109, understood to be previously provided by a customer of an electronic commerce application, may be plotted on a digital map 106. It is understood that the digital map 106 may depict a particular geographic region and the delivery addresses 109a may be associated with locations in the particular geographic region. The details of one or more candidate routes 115 may be shown comprising the order of addresses 109b to be visited during the candidate route 115. Statistics 112 associated with the calculation of the delivery route(s) may also be determined and/or provided.

Next a discussion of the computing environment is provided in which the user interface 126 of FIG. 1 is generated followed by a discussion of the operation of the same.

Figure 2:
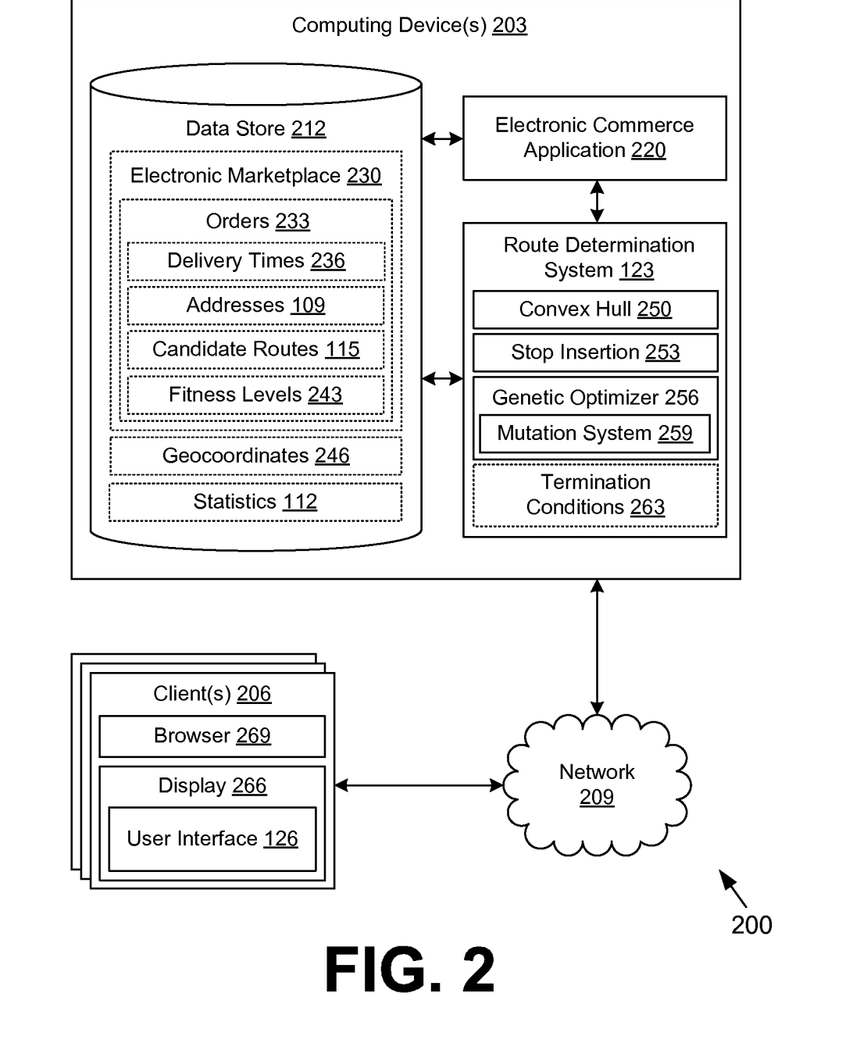
FIG. 2 is a drawing of the networked environment according to various embodiments of the present disclosure.

With reference to FIG. 2, shown is a networked environment 200 according to various embodiments. The networked environment 200 includes a computing device 203 in data communication via a network 209. The network 209 includes, for example, the Internet, intranets, extranets, wide area networks (WANs), local area networks (LANs), wired networks, wireless networks, or other suitable networks, etc., or any combination of two or more such networks.

The computing device 203 may comprise, for example, a server computer or any other system providing computing capability. Alternatively, the computing device 203 may employ a plurality of computing devices that may be arranged, for example, in one or more server banks or computer banks or other arrangements. Such computing devices may be located in a single installation or may be distributed among many different geographical locations. For example, the computing device 203 may include a plurality of computing devices that together may comprise a cloud computing resource, a grid computing resource, and/ or any other distributed computing arrangement. In some cases, the computing device 203 may correspond to an elastic computing resource where the allotted capacity of processing, network, storage, or other computing-related resources may vary over time.

Various applications and/or other functionality may be executed in the computing device 203 according to various embodiments. Also, various data is stored in a data store 212 that is accessible to the computing device 203. The data store 212 may be representative of a plurality of data stores 212 as can be appreciated. The data stored in the data store 212, for example, is associated with the operation of the various applications and/or functional entities described below.

The components executed on the computing device 203, for example, include an electronic commerce application 220, a route determination system 123 (FIG. 1), and other applications, services, processes, systems, engines, or functionality not discussed in detail herein.

The electronic commerce application 220 is executed in order to facilitate the online purchase of items over the network 209. The electronic commerce system 220 also performs various backend functions associated with the online presence of a merchant in order to facilitate the online purchase of items as will be described. For example, the electronic commerce system 220 generates network pages such as web pages or other types of network content that are provided to clients 206 for the purposes of selecting items for purchase, rental, download, lease, or other form of consumption as will be described.

The route determination system 123 may be executed to generate a plurality of candidate routes 115 (FIG. 1) to be used in the delivery of items to one or more locations or addresses provided by one or more customers through, for example, an electronic commerce application 220. The route determination system 123 includes various components for analyzing provided addresses 109 (FIG. 1) to generate and optimize the candidate routes 115. For example, the route determination system 123 may comprise a component for convex hull 250 analysis, a stop insertion 253 component, a genetic optimizer 256 comprising a mating system, a mutation system 259, and/or termination conditions 263, described in greater detail below.

The data stored in the data store 212 includes, for example, data associated with an electronic marketplace 230, and potentially other data. The orders 233 for the purchase of items may be associated with delivery times 236 and addresses 109. The delivery time 236 comprises a period of time that has been specified during the process of ordering the items for delivery within which the delivery is to be made. A plurality of addresses 109 and delivery times 236 associated with orders 233 may be collected to be used by the route determination system 123 in the determination and optimization of candidate routes 115. Candidate routes 115 accordingly may be stored in association with one or more orders 233 and/or one or more delivery times 236. Fitness levels 243 may be determined by the route determination system 123 and may be stored in association with the candidate routes 115. Geocoordinates 246 may be stored in association with an address 109 and/or an order 233 and may be used in the determination and optimization of candidate routes 115. Statistics 112 (FIG. 1) may be compiled during the course of determining and/or optimizing candidate routes 115 and stored in association with one or more candidate routes 115.

The client 206 is representative of a plurality of client devices that may be coupled to the network 209. The client 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 206 may include a display 266. The display 266 may comprise, for example, one or more devices such as liquid crystal display (LCD) displays, gas plasma-based flat panel displays, organic light emitting diode (OLED) displays, LCD projectors, or other types of display devices, etc.

The client 206 may be configured to execute various applications such as a client application and/or other applications. The client application may be executed in a client 206, for example, to access network content served up by the computing device 203 and/or other servers, thereby rendering a user interface 126 (FIG. 1) on the display 266. The client application may, for example, correspond to a browser 269, a mobile application, etc., and the user interface 126 may correspond to a network page, a mobile application screen, etc. The client 206 may be configured to execute applications beyond the client application such as, for example, browsers, mobile applications, email applications, social networking applications, and/or other applications.

Next, a general description of the operation of the various components of the networked environment 200 is provided. To begin, it is assumed that the plurality of orders 233 for items are generated through the electronic commerce application 220 in association with interactions of various users operating clients 206 over the network 209 as can be appreciated. Alternatively, orders 233 may be generated by mail, telephone, facsimile, SMS, or in any other manner. A delivery address 109 is associated with the order 233 by virtue of the fact that the order 233 is associated with a user account that includes the customer address 109.

Over time, multiple orders 233 are accumulated leading to a delivery. Given that an address 109 is associated with each order 233, a plurality of addresses 109 may be bundled for a delivery. It is understood that the addresses 109 may be bundled according to a region, city, states, and/or any other geographic area.

The route determination system 123 may determine, optimize, and/or plot a route that may be taken to deliver the purchased items to each address in that particular region. Initially, the route determination system 123 may associate each of the addresses 109 with a corresponding geocoordinate 246. The route determination system 123 then applies a convex hull 250 to the outermost geocoordinates 246 to create a set of routes that may be taken by a driver to visit each of the outermost geocoordinates 246. A convex hull 250 is the smallest possible convex polygon encompassing all geocoordinates 246. The stop insertion 253 component may randomly insert the innermost geocoordinates 246 into the routes to create an initial set of candidate routes 115, wherein each candidate route 115 is a possible delivery route taken to visit each geocoordinate 246.

It is understood that some candidate routes 115 may be inefficient relative to other candidate routes 115. For example, some candidate routes 115 may require a greater travel distance or travel time to complete all deliveries. Accordingly, the route determination system 123 may further optimize the initial set of candidate routes 115 using a genetic optimizer 256. For example, the genetic optimizer 256 may be applied to the initial set of candidate routes 115 to generationally remove inefficient candidate routes 115 by retaining the elite candidate routes (i.e., candidate routes 115 associated with the highest fitness scores). This is accomplished by candidate routes 115 going through a series of pairings, matings, and/or mutations via mutation system 259. For example, by mutating segments of the candidate routes 115, the order of delivery of the geocoordinates 246 may be rearranged to generate new candidate routes 115. Additionally, the newly generated candidate routes 115 may be optimized by genetic optimizer 256. The genetic method of optimization may be applied until a termination condition 263 is reached.

Furthermore, the route determination system 123 may encode a user interface 126 comprising a digital map 106 and one or more of the candidate routes 115. The candidate routes 115 may be displayed on the digital map 106 in association with details of the candidate route 115. The user interface 126 may further comprise statistics 112 associated with the computation of the candidate routes 115. The user interface 126 may be transmitted to a client 206 to be rendered in a display 266. For example, a client 206 may be an electronic device in a delivery truck configured to provide real-time driving directions.

Figure 3:
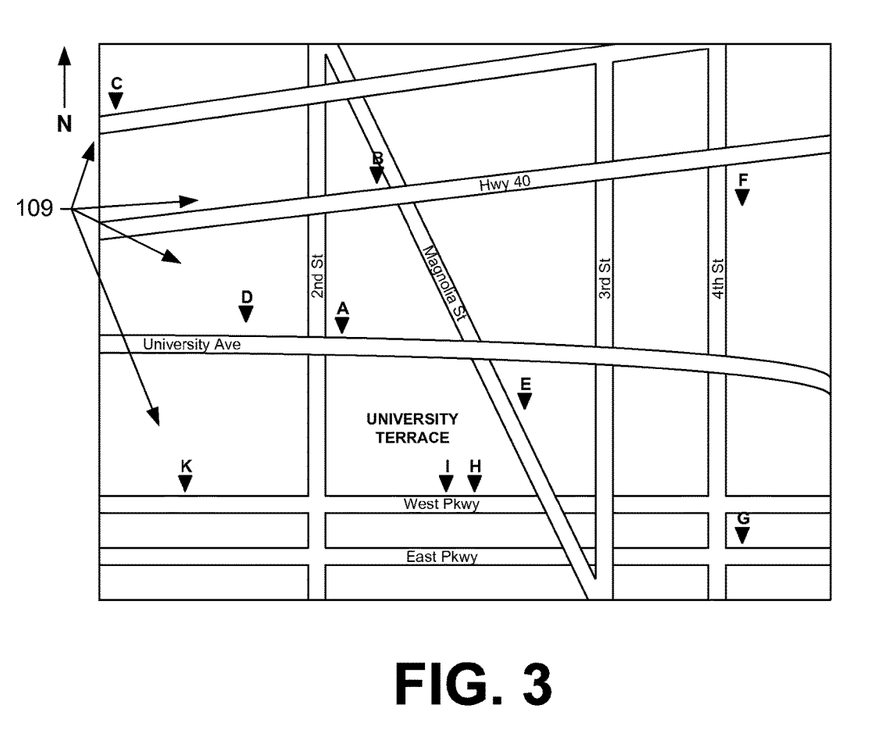
FIG. 3 is a drawing of geocoordinates plotted on the digital map of FIG. 1 according to various embodiments of the present disclosure.

Referring next to FIG. 3, shown is an example of a digital map 106 (FIG. 1) comprising multiple delivery addresses 109 associated with a particular region. It is understood that the addresses 109, represented as points A-I, may be converted to geocoordinates 246 (FIG. 2). The determination of the outermost geocoordinates and the innermost geocoordinates will be determined as discussed in greater detail below.

Figure 4A:
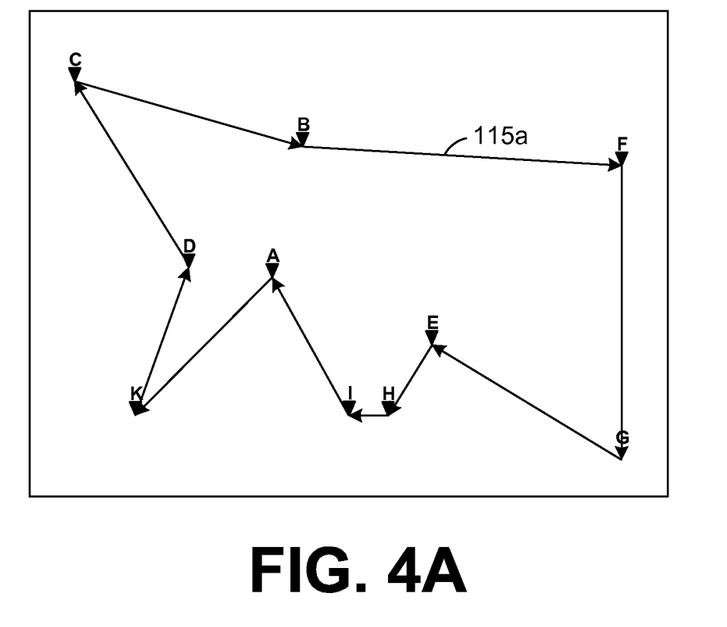
FIGS. 4A-B are drawings of the merging of the multiple stops of FIG. 3 into one stop in order to achieve dimensionality reduction according to various embodiments of the present disclosure.

Moving on to FIG. 4A, shown is an example of a candidate route 115. In this non-limiting example, point C, representing a geocoordinate 246 (FIG. 2), is the starting point of the candidate route 115. It is understood that a delivery driver may proceed from one geocoordinate 246 to another until all deliveries have been completed. In this example, the deliveries may be completed in a clockwise manner. However, it is understood that alternative candidate routes 115 may be followed and/or may be more efficient.

Figure 4B:
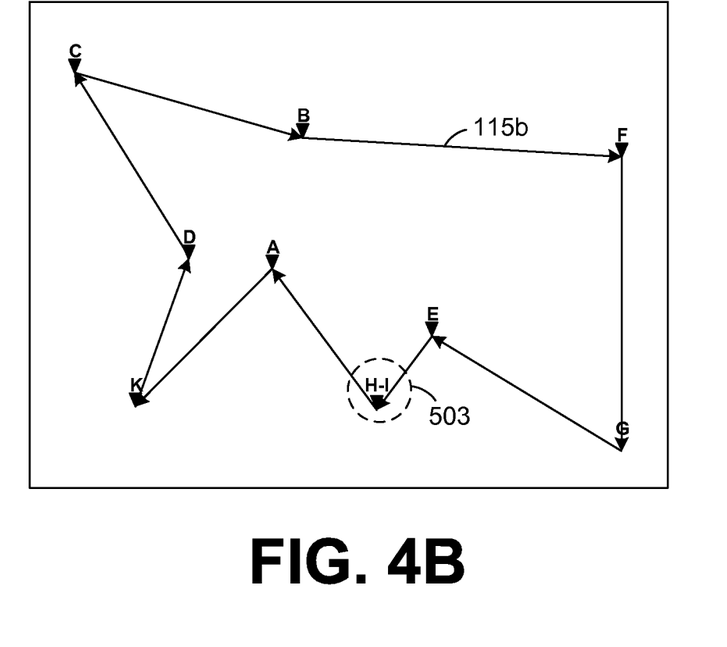

In FIG. 4B, shown is an example of reducing the dimensions of a candidate route 115. For example, two or more geocoordinates 246 (FIG. 2), understood to be delivery stops during the route, that are located on a same street segment may be consolidated and represented by one geocoordinate 246 representing the multiple geocoordinates 246. For example, points H and I are located in the same street segment and are proximal in relation, as shown in FIG. 3. In FIG. 4B, points H and I are consolidated to form a consolidated point 503. For example, it may be inefficient for a delivery truck to only make one delivery on a street, ignore proximal geocoordinates 246, proceed to another geocoordinate 246, and then return to the same street later to make another delivery. By consolidating proximal geocoordinates 246, the dimensions of the analysis may be reduced without sacrificing efficiency of a candidate route 115. For example, less computing resources and/or time may be consumed for determining candidate routes 115 based on nine points than determining candidate routes 115 based on ten points.

Figure 5:
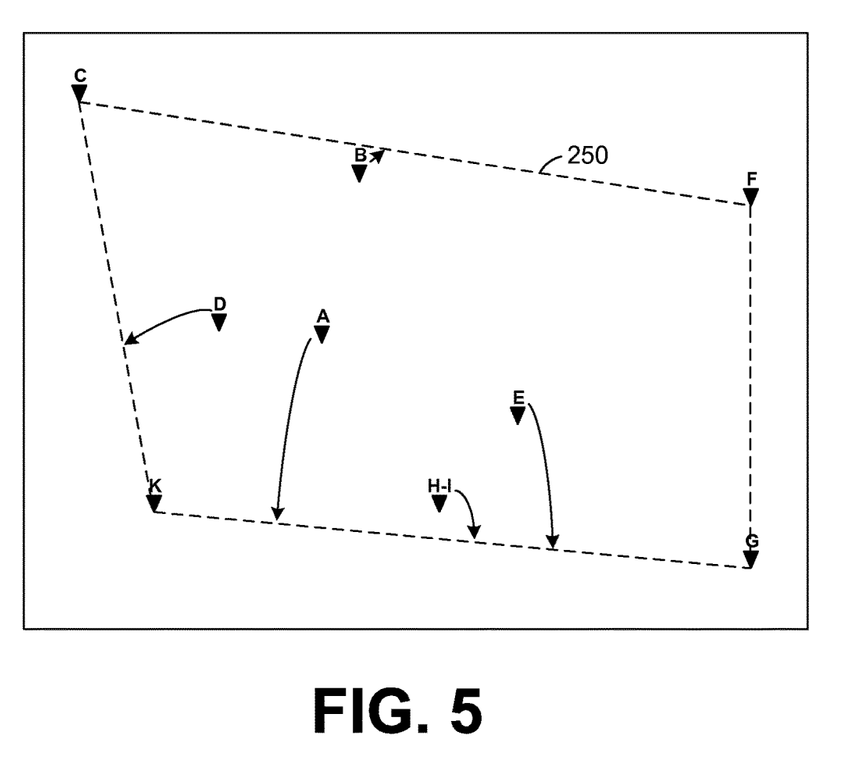
FIG. 5 is a drawing of the convex hull associated with geocoordinates of FIG. 3 according to various embodiments of the present disclosure.

Turning now to FIG. 5, shown is an example of a convex hull 250 comprising the outermost geocoordinates 246 determined by the route determination system 123 (FIG. 1). The points in the interior of the convex hull 250 are understood to be the innermost geocoordinates 246 (FIG. 2).

To create a complete set of geocoordinates 246 to form a candidate route 115, the innermost geocoordinates 246 may be randomly selected and inserted in segments of the convex hull 250 associated with the best fitness levels by the stop insertion 253 component (FIG. 2), wherein the insertion of the segments may induce a low cost overhead. For example, point E may be inserted randomly in the route from G to K because the extra overhead (cost(G→E)+cost (E→K)−cost (G-K)) is minimal compared to insertion in other parts of the candidate route 115. After inserting point E, point A is randomly selected and inserted in the route from E to K, and so on. This process may continue to create different random combinations of candidate routes 115 (FIG. 1) comprising each geocoordinate 246 until all possible combinations have been met and/or until a condition has been met.

Figure 6A:
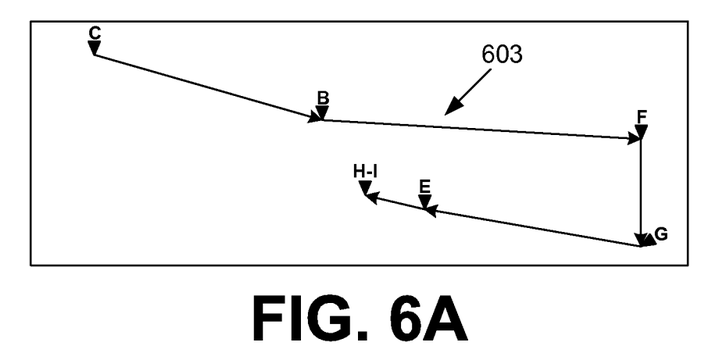
FIGS. 6A-C are drawings of mutations of the routes of FIGS. 4A-B applied by the route determination system according to various embodiments of the present disclosure.

Turning now to FIG. 6A, shown is an example of a segment 603 of a candidate route 115 similar to the candidate route 115 shown previously in FIG. 4. The segment comprises two sub-segments. For example, segments exist between points C and B, B and F, F and G, G and E, and E and H-I. It is understood that a segment is a route taken from one point, or stop, to another.

Figure 6B:
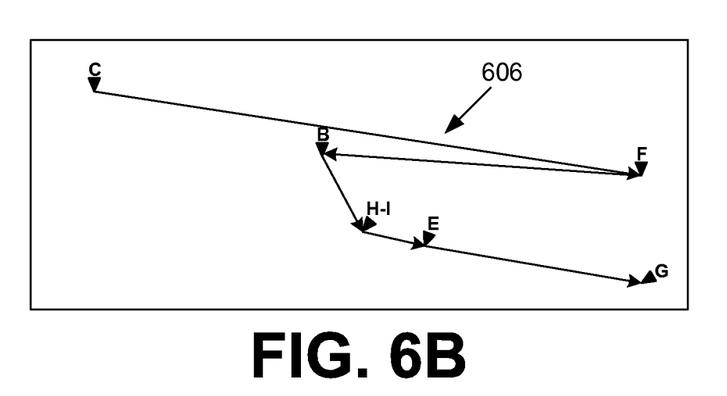

FIG. 6B depicts a mutation determined by mutation system 259 (FIG. 2). The segment 606 of the candidate route 115, depicted in FIG. 6A, is mutated to create another possible segment. This segment may be formed with other segments to create additional candidate routes 115. In this non-limiting example, segments are created between points C and F, F and B, B and H-I, H-I and E, and E and G.

Figure 6C:
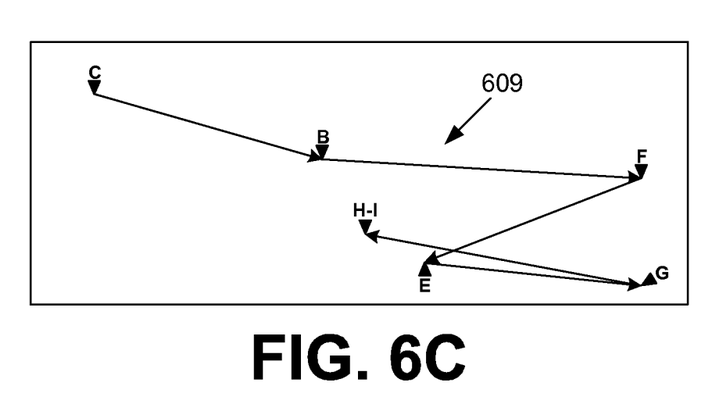

FIG. 6C depicts another possible mutation determined by mutation system 259. The segment 609 of the candidate route 115, depicted in FIG. 6A, is mutated to create another possible segment. In this non-limiting example, segments are created between points C and B, B and F, F and E, E and G, and G and H-I. It is understood that duplicate candidate routes 115 may be removed from the analysis.

Figure 7:
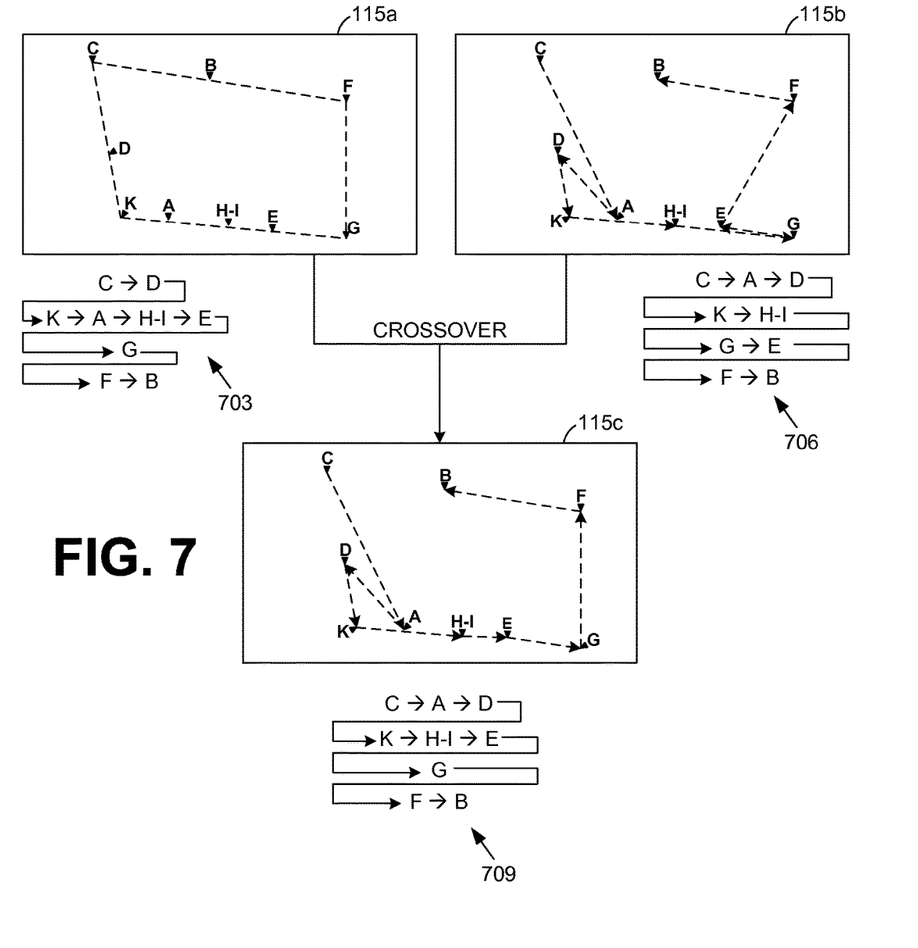
FIG. 7 is a drawing of a crossover of sample routes applied by the route determination system according to various embodiment of the present disclosure.

FIG. 7 depicts a non-limiting example of a crossover that may be applied by the route determination system 123 according to various embodiments. A crossover may be a method of generating additional routes by inheriting and recombining features similar to parent candidate routes. In this non-limiting example, a crossover of parent candidate route 115a is conducted with parent candidate route 115b to determine one or more children candidate routes 115c. It is understood that parent candidate route 115a and parent candidate route 115b are determined from the same convex hull. Parent candidate route 115a differs from parent candidate route 115b in that each have a unique sequence representing a route taken to visit each location or stop along the route. For example, sequence 703 shows one possible sequence taken to travel from a vertex (e.g., a first stop) to the remaining stops in the route. Sequence 703, corresponding to candidate route 115a, and sequence 706, corresponding to candidate route 115b, may comprise two or more segments. For example, sequence 703 and sequence 706 may be divided into four segments (e.g., one for each line as shown in FIG. 7). A crossover may be applied by starting from the first segment by picking a better one of the two segments from parent candidate route 115a and parent candidate route 115b. The remaining portion of the sequence 709 corresponding to child candidate route 115c may be constructed by recombining and/or merging the second, third, and fourth, segments from parent candidate route 115a and parent candidate route 115b. In determining which parents and/or which segments to inherit, a fitness level may be used.

Accordingly, to perform various analyses on candidate routes 115, it may be beneficial to represent a sequence corresponding to a candidate route 115 in two dimensions as opposed to one dimension. For example, the candidate route 115a, represented as one dimension, may reference a sequence as: C, D, K, A, H-I, E, G, F, and B, wherein the sequence represents the order of stops taken to complete a candidate route 115. Alternatively, a two dimensional sequence may be represented as (1) C, D; (2) K, A, H-I, E; (3) G; and (4) F, B, as shown with respect to sequence 703 (e.g., a segment for each line in the sequence). This may facilitate analyses of candidate routes 115, as well as crossovers of candidate routes 115, by permitting segments of the sequence to be compared to segments of other sequences. This may reduce the need of having to compare a candidate route 115a in its entirety to another candidate route 115.

Figure 8:
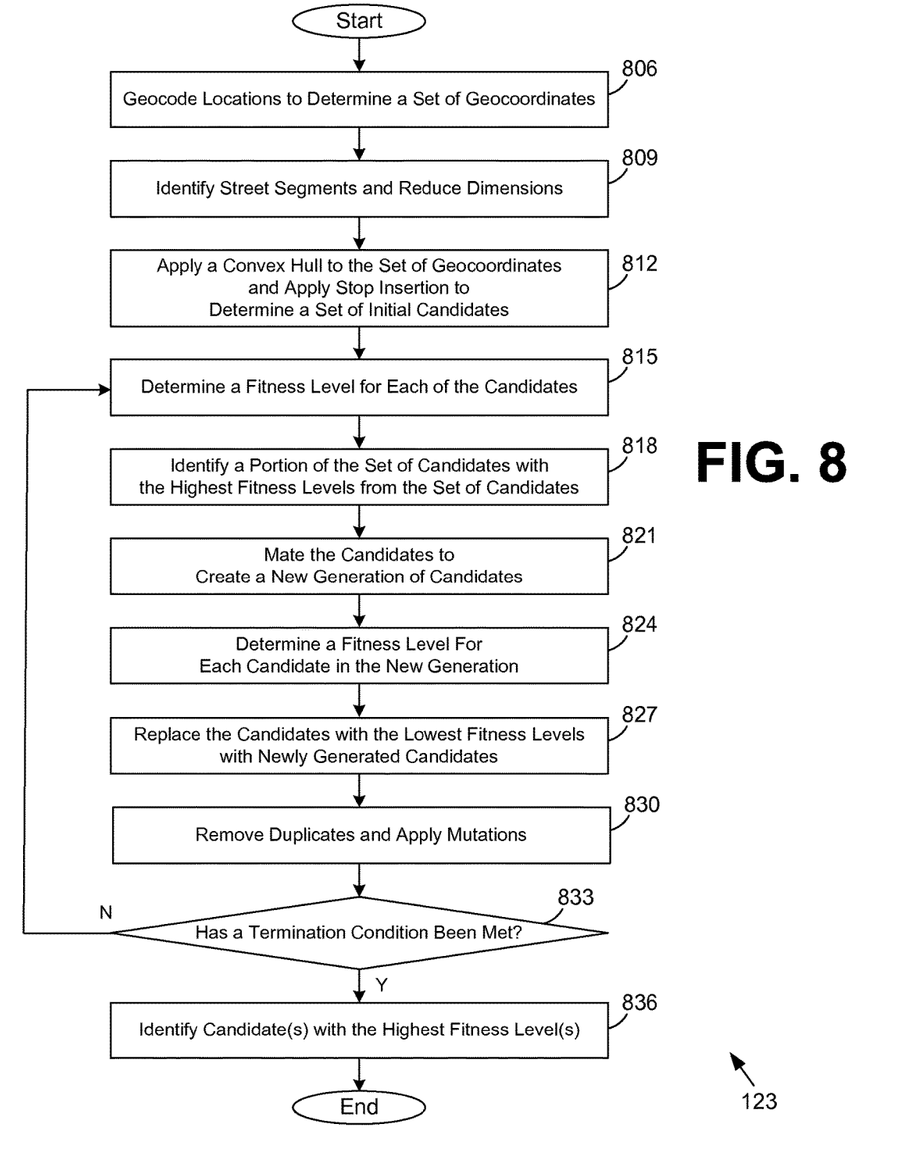
FIG. 8 is a flowchart illustrating one example of functionality implemented as portions of a route determination system executed in a computing environment in the networked environment of FIG. 2 according to various embodiments of the present disclosure.

Referring next to FIG. 8, shown is a flowchart that provides one example of the operation of a portion of the route determination system 123 (FIG. 1) according to various embodiments. It is understood that the flowchart of FIG. 8 provides merely an example of the many different types of functional arrangements that may be employed to implement the operation of the portion of the route determination system 123 as described herein. As an alternative, the flowchart of FIG. 8 may be viewed as depicting an example of steps of a method implemented in the computing environment 200 (FIG. 2) according to one or more embodiments.

Beginning with box 806, addresses 109 (FIG. 1) associated with stops of a delivery route may be received, for example, from a client device 206 (FIG. 2) or a data store 212 (FIG. 2). For example, a customer may submit an address 109 for delivery while purchasing an item over the electronic commerce application 220 (FIG. 2). The address 109 may be stored in data store 212 in association with the order and/or in association with the customer's account. Alternatively, the route determination system 123 may prompt a user of a client 206 with a series of user interfaces requesting addresses to be used in route determination. The addresses 109 may be converted to or associated with geocoordinates 246 (FIG. 2) corresponding to a respective address 109. For example, an address 109 associated with a delivery stop may be associated with numerical values representing a longitude and/or a latitude.

Next, in box 809, street segments may be determined based at least in part on the geocoordinates 246, the addresses 109, and/or a digital map. For example, the addresses 109 received in box 806 may be used to determine a geographic region comprising of a series of roads or street segments. It is understood that the location of the street segments may be used in the determination of a route. Additionally, identification of the street segments may be used in reducing the dimensions of the route determination system 123. For example, if two geocoordinates 246 representing stops in a route are determined to be in proximal location on a same street segment, the geocoordinates 246 may be coalesced and an existing geocoordinate 246 may be used to express both addresses 109. It is understood that if two or more geocoordinates 246 representing delivery stops in a route are proximal in distance on a same street segment, it is likely more efficient to visit proximal geocoordinates 246 while on a same street segment during the route, rather than leaving a location only to have to return at a later time.

In box 812, a convex hull 250 (FIG. 2) may be determined for the entire set of geocoordinates 246. The vertices of the hull represent the outermost set of geocoordinates 246. A stop insertion 253 may be applied to determine a set of initial candidates. It is understood that the convex hull 250 may represent a route taken to visit each of the outermost geocoordinates. By applying stop insertion 253 to the outermost geocoordinates 246, one or more initial candidate routes 115 may be determined. To determine the convex hull 250 various convex hull 250 strategies may be implemented. For example, the left-bottom-most geocoordinate 246 may be defined as a starting point in the convex hull 250 analysis. From the starting point, the closest outermost geocoordinate 246 may then be determined in either a clockwise or counter-clockwise direction. A segment of the convex hull 250 representing a trip from the starting point to the next outermost geocoordinate 246 has then been determined. Additional outermost geocoordinates 246 will be selected until a complete convex hull 250 has been generated comprising all of the outermost geocoordinates 246. It is understood that other strategies may be employed to create a convex hull 250. Accordingly, a convex hull 250 may yield two or more groups of candidate routes 115 (e.g., one derived from a clockwise direction, one derived from a counter-clockwise direction). Each of these groups of candidate routes 115 may be optimized independently. The most efficient delivery route(s) may be determined from the groups after optimization, discussed in greater detail below.

Once a convex hull 250 has been determined comprising all of the outermost geocoordinates 246, the innermost geocoordinates 246 may be randomly selected and inserted into various segments of the convex hull 250 with the least additional cost to create random combinations of the geocoordinates 246. These random combinations may be used as initial candidate routes 115 (FIG. 1), wherein each candidate route 115 represents a potential route taken to visit each geocoordinate 246.

It is understood that by randomly creating candidate routes 115 some of the determined candidate routes 115 may not be efficient in comparison to other candidate routes 115. For example, it may be illogical for a delivery van to skip a proximal geocoordinate 246 to travel to a distal geocoordinate 246, only to return to the proximal geocoordinate 246 at a later time. Accordingly, in box 815, a fitness of the initial candidate route may be determined. The fitness of a candidate route may comprise, for example, a measure the efficiency of the candidate route 115 relative to other candidate routes 115. For example, a fitness may be an estimation of the cost necessary to travel a route. The estimation of the cost may be based on, for example, the distance required to travel the route and/or the travel time required to travel the route.

Next, in box 818, a portion of the candidate routes 115 having a higher fitness may be identified from the set of candidate routes 115 to be retained. The retained portion of the candidate routes 115 may be based at least in part on a predefined percentile and/or any other threshold. The retained portion of the candidate routes 115 participate in the optimization process as well as the non-retained portion of the candidate routes 115. In box 821, the route determination system 123 may genetically optimize the other candidate routes 115 by mating candidate routes 115 to create new generations of candidate routes 115. For example, at least two of the candidate routes 115 may be selected for mating based at least in part on their fitness. Mating the two candidate routes 115 may comprise applying one of several implementations of a genetic crossover. For example, certain segments of a candidate route 115 may be combined with certain segments of a different candidate route 115 (i.e., the "parents") to create a new "child" candidate route 115 comprising of segments reminiscent of the two parent candidate routes 115. The portion of the candidate routes 115 retained in box 818 may be copied to the next generation as exact copy of themselves. It is understood that these retained portion of candidate routes 115 may include candidate routes 115 with higher fitness levels. Accordingly, there is an increased probability that these candidate routes 115 will be selected as "parents" in the genetic crossover process and that the features of the "parent" may be passed to their "child" candidate routes 115. Next, in box 824, a fitness of the children candidate routes 115 may be determined. In box 827, a portion of the candidate routes 115 associated with low fitness may be replaced with newly generated candidate routes 115.

In box 830, duplicate candidate routes 115 may be determined and/or removed. Mutations of the candidate routes 115 may be determined by generating different possible combinations of candidate routes 115 that have yet to be analyzed. In box 833, it is determined whether a termination condition 263 (FIG. 2) has been met. A termination condition 263 may include predefining a fixed number of generations, predefining an amount of computation time, reaching a predefined fitness, and/or any other condition. If a termination condition 263 has not yet been met, another iteration may occur. For example, the mutations generated in box 830 may have a fitness level 243 (FIG. 2) associated with the mutation. Alternatively, if a termination condition 263 has been met, candidate routes 115 with the highest, most efficient, fitness levels may be identified in box 836. Finally, one or more of the candidate routes 115 may be returned to a requesting process.

Figure 9:
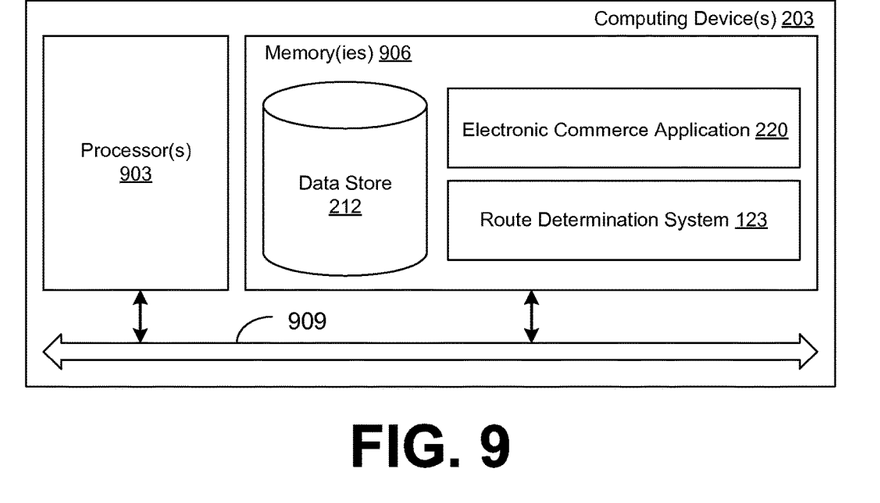
FIG. 9 is a schematic block diagram that provides one example illustration of a computing environment employed in the networked environment of FIG. 2 according to various embodiments of the present disclosure.

With reference to FIG. 9, shown is a schematic block diagram of the computing device 203 according to an embodiment of the present disclosure. The computing device 203 includes one or more computing devices 203 Each computing device 203 includes at least one processor circuit, for example, having a processor 903 and a memory 906, both of which are coupled to a local interface 909. To this end, each computing device 203 may comprise, for example, at least one server computer or like device. The local interface 909 may comprise, for example, a data bus with an accompanying address/control bus or other bus structure as can be appreciated.

Stored in the memory 906 are both data and several components that are executable by the processor 903. In particular, stored in the memory 906 and executable by the processor 903 are the electronic commerce application 220, the route determination system 123, and potentially other applications. Also stored in the memory 906 may be a data store 212 and other data. In addition, an operating system may be stored in the memory 906 and executable by the processor 903.

It is understood that there may be other applications that are stored in the memory 906 and are executable by the processor 903 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 906 and are executable by the processor 903. In this respect, the term "executable" means a program file that is in a form that can ultimately be run by the processor 903. Examples of executable programs may be, for example, a compiled program that can be translated into machine code in a format that can be loaded into a random access portion of the memory 906 and run by the processor 903, source code that may be expressed in proper format such as object code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 906 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903 may represent multiple processors 903 and/or multiple processor cores and the memory 906 may represent multiple memories 906 that operate in parallel processing circuits, respectively. In such a case, the local interface 909 may be an appropriate network that facilitates communication between any two of the multiple processors 903, between any processor 903 and any of the memories 906, or between any two of the memories 906, etc. The local interface 909 may comprise additional systems designed to coordinate this communication, including, for example, performing load balancing. The processor 903 may be of electrical or of some other available construction.

Although electronic commerce application 220, route determination system 123, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 8 shows the functionality and operation of an implementation of portions of the route determination system 123. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 903 in a computer system or other system. The machine code may be converted from the source code, etc. If embodied in hardware, each block may represent a circuit or a number of interconnected circuits to implement the specified logical function(s).

Although the flowchart of FIG. 8 shows a specific order of execution, it is understood that the order of execution may differ from that which is depicted. For example, the order of execution of two or more blocks may be scrambled relative to the order shown. Also, two or more blocks shown in succession in FIG. 8 may be executed concurrently or with partial concurrence. Further, in some embodiments, one or more of the blocks shown in FIG. 8 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 220 or the route determination system 123, that comprises software or code can be embodied in any non-transitory computer-readable medium for use by or in connection with an instruction execution system such as, for example, a processor 903 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system for determining an optimal delivery route, comprising:
    at least one computing device; and
    program instructions executable in the at least one computing device that, when executed, cause the at least one computing device to perform a method comprising:
        identifying a plurality of geocoordinates for at least one of a plurality of locations;
        generating a plurality of candidate routes by applying a convex hull to an outermost subset of the geocoordinates and psuedorandomly inserting an innermost subset of the geocoordinates into segments of the convex hull while minimizing a change in travel cost for the segments, the convex hull being a smallest possible convex polygon encompassing the geocoordinates as coalesced;
        applying a genetic optimization to the plurality of candidate routes until a termination condition has been satisfied by:
            identifying a plurality of street segments for at least one of the candidate routes based at least in part on the geocoordinates and digital map data;
            for the at least one of the candidate routes, coalescing at least two different ones of the geocoordinates located on a same one of the street segments into a single geocoordinate;
            determining a fitness level for individual ones of the candidate routes;
            retaining at least one of the candidate routes based at least in part on the fitness level determined for the individual ones of the candidate routes; and
            replacing a first portion of the candidate routes having the fitness level lower than a second portion of the candidate routes with a mutated one of the candidate routes; and
        identifying the optimal delivery route as one of the candidate routes based at least in part on a corresponding fitness level.

2. The system of claim 1, wherein:
    the fitness level is a first fitness level; and
    the method further comprises:
        mating at least two of the candidate routes based at least in part on the first fitness level determined for the at least two of the candidate routes; and
        determining a second fitness level for individual ones of the candidate routes.

3. The system of claim 2, wherein:
    the mutated one of the candidate routes is determined by rearranging the geocoordinates in one of the candidate routes to generate the mutated one of the candidate routes, wherein the mutated one of the candidate routes comprises a route not previously analyzed during the genetic optimization; and
    the method further comprises:
        determining a third fitness level for individual ones of the candidate routes; and
        retaining at least one of the candidate routes based at least in part on the third fitness level determined for the individual ones of the candidate routes.

4. The system of claim 3, wherein at least one of the first fitness level, the second fitness level, and the third fitness level is determined based at least in part on an estimated route travel time.

5. The system of claim 3, wherein at least one of the first fitness level, the second fitness level, and the third fitness level is determined based at least in part on an estimated route distance.

6. The system of claim 1, wherein the termination condition comprises a fixed number of generations, an amount of computation time, or a predefined fitness level being reached.

7. The system of claim 1, wherein the plurality of geocoordinates are identified as being in at least one geographic area.

8. The system of claim 1, wherein applying the convex hull to the geocoordinates to determine the candidate routes yields a first order of the candidate routes and a second order of the candidate routes, the first order determined using a clockwise direction and the second order determined using a counter-clockwise direction, wherein the candidate routes comprise both the first order of the candidate routes and the second order of the candidate routes.

9. A non-transitory computer-readable medium for programmatically optimizing a delivery route using a non-deterministic polynomial-time (NP) complete computation embodying program instructions executable in at least one computing device that, when executed, cause the at least one computing device to perform a method comprising:
    determining a plurality of geocoordinates for a corresponding plurality of delivery locations identified from a plurality of orders of items originated over a network, wherein the delivery locations are bundled according to a geographic area;
    generating a plurality of candidate routes by applying a convex hull to an outermost subset of the geocoordinates and pseudorandomly inserting an innermost subset of the geocoordinates into segments of the convex hull while minimizing a change in travel cost for the segments, the convex hull being a smallest possible convex polygon encompassing the geocoordinates;

applying a genetic optimization to the candidate routes until a termination condition has been satisfied by performing a plurality of iterations of:

identifying a plurality of street segments for at least one of the candidate routes based at least in part on the geocoordinates and digital map data;

for the at least one of the candidate routes, coalescing at least two different ones of the geocoordinates located on a same one of the street segments into a single geocoordinate;

determining a fitness level for individual ones of the candidate routes as a function of an estimated route travel time or an estimated route distance identified for a corresponding one of the candidate routes;

inserting individual ones of an innermost subset of the geocoordinates into segments in the candidate routes based at least in part on the fitness level;

retaining at least a portion of the candidate routes based at least in part on the fitness level, the portion of the candidate routes retained having a higher fitness level than a non-retained one of the candidate routes;

mating at least two of the candidate routes as retained based at least in part on the fitness level determined for the at least two of the candidate routes to create additional ones of the candidate routes for inclusion in a new generation of candidate routes; and replacing a first portion of the new generation of candidate routes having a second fitness level lower than a second portion of the new generation of candidate routes with at least one newly generated candidate route, the at least one newly generated candidate route comprising a mutated one of the additional ones of the candidate routes;

identifying the optimal delivery route as one of the new generation of candidate routes based at least in part on a corresponding fitness level; and generating a user interface for display on a client device, wherein the user interface comprises the optimal delivery route and a map for performing a delivery of items at individual ones of the delivery locations in accordance with the optimal delivery route.

10. The non-transitory computer-readable medium of claim 9, wherein the method further comprises:

in response to the termination condition not being met, determining a third fitness level for the individual ones of the candidate routes; and identifying and retaining at least a portion of the candidate routes based at least in part on the third fitness level determined for the individual ones of the candidate routes.

11. The non-transitory computer-readable medium of claim 10, wherein the termination condition comprises a fixed number of generations, an amount of computation time, or a predefined fitness level being reached.

12. The non-transitory computer-readable medium of claim 9, wherein the mutated one of the additional ones of the candidate routes is determined by:

rearranging the geocoordinates in one of the additional ones of the candidate routes to generate the mutated one of the additional ones of the candidate routes, wherein the mutated one of the additional ones of the candidate routes comprises a route not previously analyzed during the genetic optimization.

13. The non-transitory computer-readable medium of claim 9, wherein the fitness level is an estimated route travel time or an estimated route distance.

14. The non-transitory computer-readable medium of claim 9, wherein applying the convex hull to the geocoordinates to determine the candidate routes yields a first order of delivery of the candidate routes and a second order of delivery of the candidate routes, the first order of delivery determined using a clockwise direction and the second order of delivery determined using a counter-clockwise direction, wherein the candidate routes comprise both the first order of delivery of the candidate routes and the second order of delivery of the candidate routes.

15. A method for determining an optimal delivery route using a non-deterministic polynomial-time (NP) complete computation, comprising:

determining, via at least one computing device, a plurality of geocoordinates, individual ones of the geocoordinates corresponding to at least one of a plurality of delivery locations;

generating a plurality of candidate routes by applying, via the at least one computing device, a convex hull to an outermost subset of the geocoordinates and pseudo-randomly inserting an innermost subset of the geocoordinates into segments of the convex hull while minimizing a change in travel cost for the segments, the convex hull being a smallest possible convex polygon encompassing the geocoordinates;

applying, via the at least one computing device, a genetic optimization to the plurality of candidate routes until a termination condition has been satisfied by:

identifying a plurality of street segments for at least one of the candidate routes based at least in part on the geocoordinates and digital map data;

for the at least one of the candidate routes, coalescing at least two different ones of the geocoordinates located on a same one of the street segments into a single geocoordinate;

determining a fitness level for individual ones of the candidate routes;

mating at least two of the candidate routes based at least in part on the fitness level of the at least two of the candidate routes to create a plurality of additional candidate routes; and replacing a first portion of the candidate routes having a lower fitness level than a second portion of the candidate routes with a mutated one of the candidate routes; and identifying, via the at least one computing device, an optimal delivery route from at least one of the candidate routes or the additional candidate routes based at least in part on the fitness level.

16. The method of claim 15, further comprising identifying and retaining, via the at least one computing device, at least a portion of the candidate routes based at least in part on the fitness level.

17. The method of claim 15, further comprising plotting, via the at least one computing device, the optimal delivery route on a digital map that comprises a plurality of streets.

18. The method of claim 15, further comprising measuring, via the at least one computing device, a plurality of statistics associated with an identification of the optimal delivery route.

19. The method of claim 15, wherein the fitness level is determined based at least in part on an estimated route travel time.

20. The method of claim 15, wherein fitness level is determined based at least in part on an estimated route distance.

21. The method of claim 15, wherein the termination condition comprises a fixed number of generations, an amount of computation time, or a predefined fitness level being reached.

22. The method of claim 15, wherein the genetic optimization further comprising applying a crossover to the candidate routes, wherein a plurality of child candidate routes generated in the crossover inherit at least one segment of a parent candidate route.

* * * * *